(12) United States Patent
Dobin et al.

(10) Patent No.: US 9,022,129 B2
(45) Date of Patent: May 5, 2015

(54) TRACKING GEOLOGIC OBJECT AND DETECTING GEOLOGIC ANOMALIES IN EXPLORATION SEISMIC DATA VOLUME

(75) Inventors: Mark W. Dobin, The Woodlands, TX (US); Chul-Sung Kim, Houston, TX (US); Ross Whitaker, Salt Lake City, UT (US)

(73) Assignee: ExxonMobil Upstream Research Company, Houston, TX (US)

( * ) Notice: Subject to any disclaimer, the term of this patent is extended or adjusted under 35 U.S.C. 154(b) by 408 days.

(21) Appl. No.: 13/059,780

(22) PCT Filed: Jul. 2, 2009

(86) PCT No.: PCT/US2009/049553
§ 371 (c)(1),
(2), (4) Date: Feb. 18, 2011

(87) PCT Pub. No.: WO2010/047856
PCT Pub. Date: Apr. 29, 2010

(65) Prior Publication Data
US 2011/0247829 A1     Oct. 13, 2011

Related U.S. Application Data

(60) Provisional application No. 61/108,375, filed on Oct. 24, 2008.

(51) Int. Cl.
*G01V 1/30* (2006.01)
(52) U.S. Cl.
CPC ...................................... *G01V 1/301* (2013.01)

(58) Field of Classification Search
USPC .............. 166/369; 702/11, 13, 14, 16, 17, 36; 703/5, 10; 367/69–73
See application file for complete search history.

(56) References Cited

U.S. PATENT DOCUMENTS

| | | | |
|---|---|---|---|
| 4,646,239 A * | 2/1987 | Bodine et al. | 702/16 |
| 5,455,896 A | 10/1995 | Takamura | |
| 5,537,320 A | 7/1996 | Simpson et al. | |
| 5,704,713 A | 1/1998 | Kim et al. | 374/136 |
| 5,987,388 A | 11/1999 | Crawford et al. | |
| 6,018,498 A | 1/2000 | Neff et al. | |
| 6,064,944 A | 5/2000 | Sarda et al. | |
| 6,140,643 A | 10/2000 | Brown et al. | 250/307 |

(Continued)

FOREIGN PATENT DOCUMENTS

| | | |
|---|---|---|
| WO | WO 02/019268 | 7/2002 |
| WO | WO 2004/038654 | 5/2004 |

OTHER PUBLICATIONS

Admasu, F. et al. (2005), "An Approach Towards Automated Fault Interpretations in Seismic Data," *SimVis*, 13 pgs.

(Continued)

*Primary Examiner* — David Andrews
*Assistant Examiner* — Taras P Bemko
(74) *Attorney, Agent, or Firm* — ExxonMobil Upstream Research Company Law Dept.

(57) ABSTRACT

A method and system are described for identifying a geologic object through cross sections of a geologic data volume. The method includes obtaining a geologic data volume having a set of cross sections. Then, two or more cross sections are selected and a transformation vector is estimated between the cross sections. Based on the transformation vector, a geologic object is identified within the geologic data volume.

25 Claims, 7 Drawing Sheets

(56) References Cited

U.S. PATENT DOCUMENTS

| | | | |
|---|---|---|---|
| 6,249,616 B1* | 6/2001 | Hashimoto | 382/284 |
| 6,442,487 B2 | 8/2002 | Kim | 702/6 |
| 6,480,615 B1 | 11/2002 | Sun et al. | |
| 6,549,879 B1 | 4/2003 | Cullick et al. | 703/10 |
| 6,611,615 B1* | 8/2003 | Christensen | 382/130 |
| 6,690,820 B2 | 2/2004 | Lees et al. | |
| 6,731,799 B1 | 5/2004 | Sun et al. | |
| 6,754,588 B2 | 6/2004 | Cross et al. | |
| 6,765,570 B1 | 7/2004 | Cheung et al. | |
| 6,987,878 B2 | 1/2006 | Lees et al. | |
| 7,068,831 B2 | 6/2006 | Florent et al. | 382/132 |
| 7,200,602 B2 | 4/2007 | Jonas | |
| 7,248,258 B2 | 7/2007 | Acosta et al. | |
| 7,330,791 B2 | 2/2008 | Kim et al. | 702/16 |
| 7,565,243 B2 | 7/2009 | Kim et al. | 702/2 |
| 8,365,831 B2 | 2/2013 | Kim et al. | 166/369 |
| 2002/0099504 A1* | 7/2002 | Cross et al. | 702/2 |
| 2004/0081353 A1* | 4/2004 | Lees et al. | 382/154 |
| 2005/0094898 A1* | 5/2005 | Xu et al. | 382/294 |
| 2010/0270027 A1 | 10/2010 | Kim et al. | 166/369 |
| 2011/0044532 A1 | 2/2011 | Holl et al. | 382/154 |

OTHER PUBLICATIONS

Clarenz, U. et al. (2002), "Towards Fast Non-Rigid Registration," Inverse Problems, Image Analysis and Medical Imaging, AMS Special Session Interaction of Inverse Problems and Image Analysis 313, pp. 67-84.

Gottesfeld Brown, L. (1992), "A Survey of Image Registration Techniques," *ACM Computing Surveys* 24(4), ACM Publisher, pp. 325-376.

Henn, S. et al. (2001), "Iterative Multigrid Regularization Techniques for Image Matching," *SIAM J. Sci. Comput* 23(4), pp. 1077-093.

Jeong, W.K. (2008), "Interactive Three-Dimensional Image Analysis and Visualization Using Graphics Hardware," Dissertation, University of Utah, pp. 17-19, 23-25 91-119.

Zitova, B. et al. (2003), "Image Registration Methods: A Survey," *Image and Vision Computing* 21, pp. 977-1000.

International Search Report and Written Opinion, dated Aug. 17, 2009, PCT/US09/49553.

European Search Report, dated Jan. 21, 2010, EP09151956.1.

Jeong, W.K. (Dec. 2008), "Interactive Three-Dimensiona Image Analysis and Visualization Using Graphics Hardware," Thesis, The University of Utah, pp. 1-70.

Jeong, W.K. (Dec. 2008), "Interactive Three-Dimensional Image Analysis and Visualization Using Graphics Hardware," Thesis, The University of Utah, pp. 71-133.

* cited by examiner

TRACKING GEOLOGIC OBJECT AND DETECTING GEOLOGIC ANOMALIES IN EXPLORATION SEISMIC DATA VOLUME

CROSS-REFERENCE TO RELATED APPLICATION

This application is the National Stage of International Application No. PCT/US2009/049553, that published as WO 2010/047856, filed Jul. 2, 2009, which claims the benefit of U.S. Provisional Patent Application No. 61/108,375, filed Oct. 24, 2008, each of which is incorporated herein by reference, in its entirety, for all purposes.

TECHNICAL FIELD

This description relates generally to the field of oil and gas exploration, resource development, and production planning. Specifically, this description relates to techniques useful for structural or stratigraphic interpretation of subsurface data, such as seismic data volumes, seismic derivative data volumes, or other similar data volumes. For example, the methods and techniques may be used to track boundaries of geologic objects and/or to detect geologic anomalies in a seismic and/or its derivative data volume or volumes.

BACKGROUND

In the oil and gas industry, seismic prospecting and other similar techniques are commonly used to aid in the search for and evaluation of subterranean hydrocarbon deposits. An exemplary prospecting operation includes three stages: data acquisition, data processing, and data interpretation. The success of the prospecting operation depends on satisfactory completion of the three stages. In an exemplary data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes. During an exemplary data processing stage, the recorded seismic signals, e.g., seismic amplitude response, are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage. The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

To interpret, a three-dimensional (3D) data volume may be either manually interpreted or interpreted through an automated method. A "data volume" or "volume" includes one or more slices or traces (e.g. a collection of samples as a function of time (t) for one position in the earth, such as seismic traces). The collection of traces or slices forming an array are commonly referred to as "data volumes." The data volume depicts the subsurface layering of a portion of the earth. It is the principal tool that a geophysicist uses to determine the nature of the earth's subsurface formations. The data volume can be studied either by plotting it on paper or displaying it on a computer monitor. A geophysicist can then interpret the information. When displaying the data volume along a principle direction, crosslines, inlines, time slices, or horizon slices can be made. The data volume can be mathematically processed in accordance with known techniques to make subtle features in the data more discernible. The results of these processing techniques are known as "attributes." The images may also be compared over a period of time to follow the evolution of the subsurface formation over time. Either of these methods may use computer-aided interpretation tools to accelerate interpretation of prospecting data (e.g., seismic, controlled source electromagnetic, or other suitable data) for detecting geologic anomalies (e.g. geologic bodies of interest) or tracking boundaries of geologic objects of interest. These geologic objects include geologic horizon surfaces, fault surfaces, stratigraphic traps, and channels, for example.

Manual interpretation typically involves the manual picking or digitizing of each geologic object of interest using the data volume as a visual guide. If this is done in a computer aided interpretation system, this involves digitizing the geologic objects on cross sections/slices or volumes using a cursor, tablet or some other input device. Additional seismic attribute volumes may be used to make the final interpretation. With manual interpretation, the interpreter keeps track of 3D complexity and geologic complexity. As such, this increases the risk for incorrect interpretation of geologic features and also greatly increases the time involved to complete the interpretation.

Alternatively, automated methods for tracking geologic objects, such as horizons and faults, have existed in the industry for twenty years. However, automated methods have limitations that hinder their effectiveness for certain types of interpretation. For instance, the automated methods may not be applicable for addressing certain interpretation problems. In particular, typical automated methods require that the feature to be tracked or extended follows a consistent or similar seismic amplitude/attributes, such as peak, trough, zero crossing, within a value range. This limitation restricts the applicability of these methods, because many of the more interesting and geologically significant surfaces that need to be interpreted do not satisfy this limitation. Examples of these geologic objects include; salt/shale diapirs, channels, unconformities, and faults and other stratigraphic features. In addition, the automated systems are also limited by the data quality and the complexity of the geology. For instance, while automated methods can be more accurate than manual methods when applied to higher quality data and simple geology, these automated methods become more error prone as the data quality decreases and the complexity of the geology increases. As such, when automated results become too error prone, the amount of time required to find and correct the errors exceeds the time to manually interpret the geologic objects. Therefore, automated methods are frequently not used for large amount of interpretation tasks due to the limitations discussed above.

The present techniques, which are described below, address weaknesses of both conventional automated methods and manual interpretation processes in tracking/extending more complex boundaries of geologic objects of interests. As a result, the present techniques may be used to reduce interpretation time, provide more accurate interpretations, and detect geologic objects (i.e. anomalous geologic regions) in prospecting data volume (e.g. seismic data and derivative volumes).

Other related material may be found in at least U.S. Pat. Nos. 5,455,896; 6,480,615; 6,690,820; 6,765,570; 6,731,799; 7,068,831; 7,200,602 and 7,248,258 and Fitsum Admasu and Klaus Tonnies, "An Approach towards Automated Fault Interpretations in Seismic Data", SimVis 2005.

SUMMARY

In one general aspect, a method or a tangible computer-readable storage medium having embodied thereon a computer program configured to, when executed by a processor, identify a geologic object through cross sections of a geologic data volume is described. The method includes obtaining a geologic data volume having a set of cross sections; selecting at least two cross sections from the set of cross sections; estimating a transformation vector between the at least two cross sections within the geologic data volume; and using the estimated transformation vector to identify a geologic object within the geologic data volume. Further, using the estimated transformation vector may also include obtaining a first identifier associated with the geologic object in one of the set of cross sections; determining an additional identifier associated with the geologic object in at least one additional cross section of the set of cross sections based on the estimated transformation vector and the obtained first identifier; storing the determined identifier of the geologic object in memory, of a computer system, for instance. Also, the using the estimated transformation vector may include visualizing magnitude and direction of the estimated transformation vector to identify the geologic object within the geologic data volume.

In one or more embodiments, the present techniques may include different aspects. For instance, the using the estimated transformation vector to identify the geologic object within the geologic data volume may include determining at least one of structural geology and stratigraphic geology associated with the geologic object within the geologic data volume. Also, the selected cross sections may are parallel to each other or may be oblique to each other. Also, the identifiers may be provided by a user the first identifier by selecting points on one of the at least two cross sections or from accessing a memory location. The identifier may include a polyline, a set of points, set of polylines, regions of a cross section and any combination thereof.

Yet in one of more other embodiments, a second identifier associated with the geologic object may be obtained in one of the cross sections, wherein the second identifier is different from the first identifier. Then, an additional identifier associated with the geologic object may be determined in at least one additional cross section of the set of cross sections based on the estimated transformation vector and the obtained second identifier. Finally, the identifiers associated with the second identifier and the first identifier may be compared to perform an uncertainty analysis.

Further still, in one or more other embodiments, the transformation vector may be modified for display. For instance, the magnitude and direction of transformation vector may be visualized separately. Also, the direction of transformation vector may be visualized by using a plurality of colors. The transformation vector may have colors assigned to different orthogonal directions and transformation vector's direction between two of the orthogonal directions may be assigned blended colors associated with the assigned colors for the two orthogonal directions.

BRIEF DESCRIPTION OF THE DRAWINGS

FIGS. 3A-3E are exemplary images of extending a geologic object identifier or a geologic feature in one cross section to a set of cross sections in accordance with certain aspects of the present techniques;

DETAILED DESCRIPTION

One or more embodiments of the present techniques described hereinafter is based on a viewpoint that the shape and/or position of an image of geologic objects in a prospecting area (e.g. a seismic cross section) may be identified as being deformed/moved relative to its neighboring areas (e.g., neighboring seismic cross sections). Geophysical terminology used herein is known to persons skilled in the art and definitions may be found in the *Encyclopedic Dictionary of Applied Geophysics* by R. E. Sheriff, v. 13, by the Society of Exploration Geophysicists (Fourth Edition).

Figure 1:
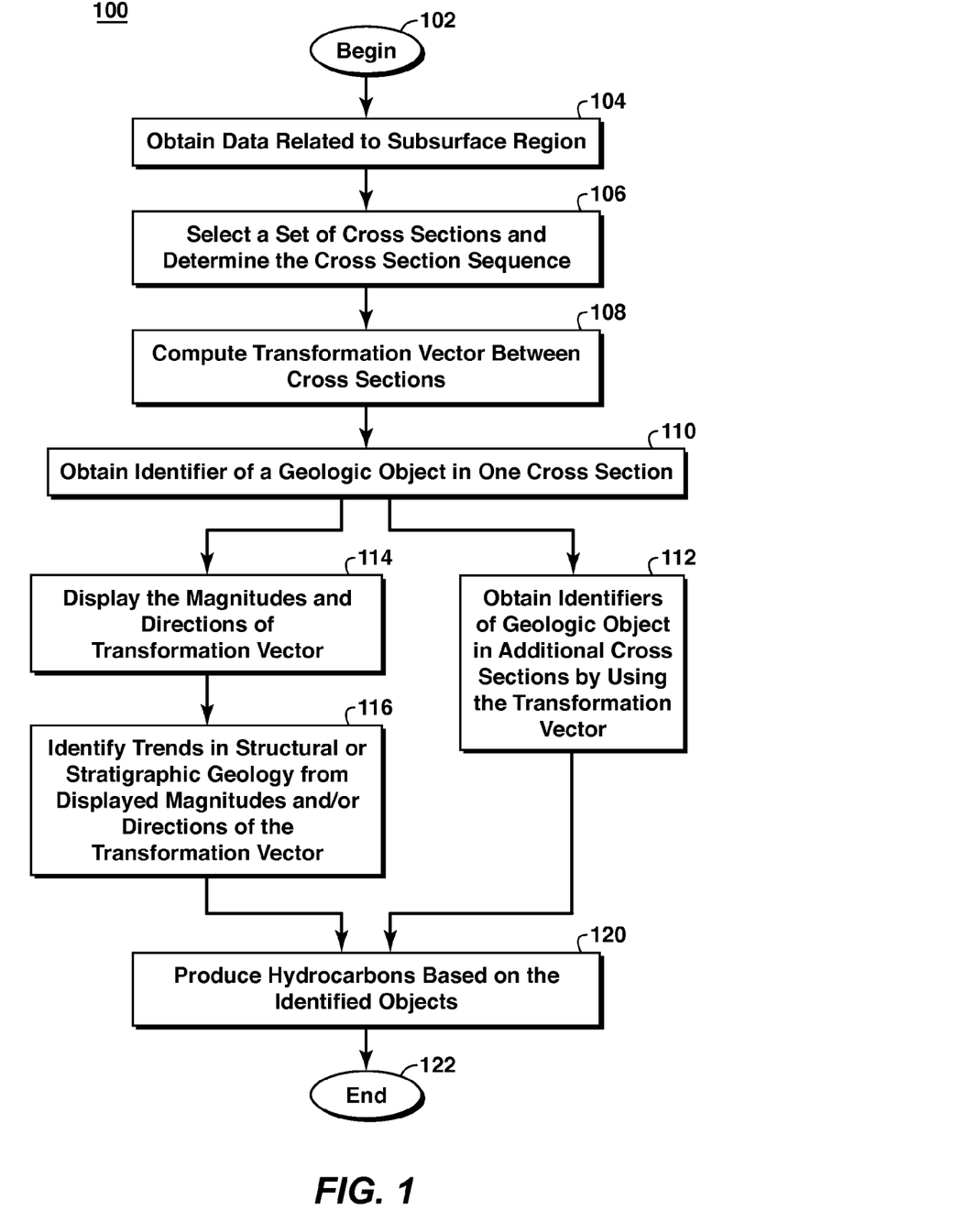
FIG. 1 is a flowchart of an exemplary process for identifying geologic objects (e.g. anomalies and tracking and creating geologic object boundaries) in accordance with certain aspects of the present techniques.

FIG. 1 is a flowchart 100 for identifying geologic objects (e.g. anomalies and tracking and creating geologic object boundaries.) As used herein, "geologic objects" refers to various sedimentary features sometimes referred to as geological bodies. More generally, geological objects are three-dimensional depositional structures in subsurface geology, which are more localized than the remainder of the depositional formations. Nonlimiting examples of geologic objects include horizon surfaces, fault surfaces, stratigraphic traps, salt/shale diapirs, channels, and other stratigraphic features. It is known to model geological objects mathematically (particularly using computer programs) in a three-dimensional structural model by a closed three-dimensional boundary surface. Modeling of subsurface structures can assist in the search for and extraction of underground assets. For example, flow behavior, connected volume and overall performance of hydrocarbon reservoirs are all highly dependent on the petrophysical properties of geological objects.

The flowchart 100 illustrates a process of obtaining an interpreted geologic object or boundaries of geologic objects in accordance with certain aspects of the present techniques. The process starts at block 102. At block 104, a geologic data volume that describes a subsurface geology for a subsurface region is obtained. The geologic data volume may include a seismic data volume and its derivative data volume and any other suitable data volume. In block 106, a set of cross sections are selected and a sequence of the cross sections are determined. A cross section is a slice of the data volume along one path or is a slice of planar geologic object that resides in the data volume. While the cross sections may be slices of the data volume along one axis, the cross sections may also be parallel to each other or oblique to each other, as described below in discussing FIGS. 5 and 6. The sequence may be determined by an ordered sequence along a specific path, or may be organized in any other suitable order. Next, in block 108, the transformation vector, which may be a transformation vector field or an inverse transformation field, is computed by determining the shape deformation and movement of boundaries of one or more geologic objects in neighboring areas (e.g. neighboring cross sections) of a data volume. The movement vector or transformation vector field are estimated to define optimal correspondence between the two neighboring area images (e.g., neighboring cross section images). For the purpose of tracking geologic object boundaries through N neighboring cross sections $I_1$ to $I_N$, the method estimates N−1 transformation vector fields $V_{i,i+1}$ for i=1 to N−1. Then, at block 110, identifiers of one or more geologic objects are obtained for one of the cross sections. The identifiers may be obtained by a user (e.g., an exploration geologist) providing a boundary of a geologic object in a form of a polyline or a set of polylines, $L_i$, at cross section i. Alternatively, the identifiers may be obtained from automated instructions to generate boundaries for a cross section. The identifiers may include a defined boundary, set of points, polyline, set of polylines, and defined region of the cross section or any combination.

Once the identifiers are obtained for the cross section, the transformation vector, which may be transformation vector fields $V_{i,i+1}$ or its inverse transformation vector fields $V_{i+1,i}$, for i=1 to N−1, is used to calculate the geologic object boundaries in the other neighboring cross sections, as shown in block 112. Here, a transformation vector field $V_{i,i+1}$ represents an optimal correspondence from an image or seismic amplitudes at cross section i to an image or seismic amplitudes at cross section i+1. The inverse transformation vector fields $V_{i+1,i}$ represents an optimal correspondence from cross section i+1 to cross section i. Compared to the conventional point-to-point correlation methods for tracking a boundary of a geologic object, such as automated horizon tracking methods, the present technique is a holistic approach that determines pixel to pixel correspondence of a cross section to a neighboring cross section. This is comparable to interpreting each of geologic objects (e.g., structures) together with their contextual relationships instead of interpreting one geologic structure without considering its spatial relationship to other geologic structures. Under the present techniques, neighboring cross sections may be parallel to each other or neighboring cross sections may be oblique to each other. Also, more than one neighboring cross section may be used to estimate transformation vector field between two cross sections. Furthermore, more than one polyline may be used to describe a geologic object or multiple polylines may be provided to describe multiple geologic objects.

Alternatively, as in block 114, the magnitudes and direction of the computed transformation vector may be display. In this block 114, the magnitudes and direction of the estimated transformation vector fields, $V_{i,i+1}$, i=1 to N−1, is useful in visualizing and detecting trends in geologic objects, such as subsurface geology and subsurface anomalies, which are often associated with hydrocarbon discovery. At block 116, trends in the structural or stratigraphic geology are identified. One example is a sub-channel that is embedded in a channel and moving in a different direction from the main region of the channel in neighboring cross sections. Another example is a channel cutting through a sloped horizon layers. In this example, the sloped horizons boundaries in neighboring cross sections move up (or down) through the neighboring cross sections, while the channel boundary may not move up (or down) at the same rate. These movement discrepancies among different geologic objects can be detected by visualizing the transformation vectors in color code and co-rendering them with seismic data amplitudes. For instance, the transformation vector may be assigned distinct colors for different orthogonal directions. The transformation vector between two of the orthogonal directions may also be assigned a blended colors associated with the assigned colors for the two orthogonal directions. In this manner, the transformation vector may be clearly visualized for a user.

Regardless, the identified boundary of the geologic objects may be used to produce hydrocarbons, as shown in block 120. The boundaries of the geologic objects may be incorporated into a model to identify one or more potential hydrocarbon-bearing zones within a reservoir. Once a hydrocarbon-bearing zones is predicted to exist, one or more wells may be drilled to access and produce the hydrocarbons from the reservoir. The process ends at block 122.

As noted above, several known technologies may be used to estimate the transformation vector field or to warping parameters of an image (e.g. cross section) for matching the next image (e.g. neighboring cross section). These technologies include image block matching algorithms (See *Image and Video Compression for Multimedia Engineering: Fundamentals, Algorithms, and Standards*, Yun Q. Shi, Huifang Sun, CRC Press, 2000) and image registration methods (See *Image registration methods: a survey*, Barbara Zitova, Jan Flusser, Image and Vision Computing 21, p977-1000, 2003 and *A survey of image registration techniques*, Lisa Gottesfeld Brown, ACM Computing Surveys, Vol. 24, Issue 4(December 1992), p325-376, ACM Publisher.)

The following describes one exemplary embodiment of estimating the transformation vector field between neighboring cross sections. This description is only for an illustrative purpose, as estimating transformation vector fields may be performed in various other methods. To begin, the transformation vector field $V_{i,i+1}$ is estimated by minimizing an objective function of equation (1), which is as follows:

$$E = \frac{1}{2}\int_\Omega (\tilde{I}_i - I_{i+1})^2 + \alpha \|\nabla V\|^2 \qquad (1)$$

where $\tilde{I}_i = I_i(x+V_{i,i+1}(x))$, $I_{i+1} = I_{i+1}(x)$, $V = V_{i,i+1}(x)$, x is a two dimensional orthogonal coordinate in a cross section domain $\Omega$, and $\alpha$ is a regularization parameter. The regularization term $\|\nabla V\|^2$ in equation (1) is used to produce a smooth vector field and to make optimization problem in equation (1) well posed, not resulting in arbitrary meaningless solutions. As one embodiment of the solutions to the optimization of equation (1), a simple gradient flow method is used with discrete updates on V along the negative gradient direction. Other numerically sophisticated methods, such as nonlinear steepest decent or conjugate gradient methods, may also be utilized as solutions to the optimization.

For images or cross sections of large deformations, a gradient-based energy minimization methods often converge to local minima providing an inaccurate transformation vector field. In the image processing technical area, a multiscale or a multilevel methods may be used to speedup the convergence and to avoid local minimum solution to equation (1) above. One of the objectives of these methods is that the transformation vector is estimated at different resolutions or scales of two images or cross sections, usually coarse-to-fine scale. These multiscale or multilevel image registration methods are utilized in industry (See, e.g., *Towards fast non-rigid regis-*

*tration*, U. Clarenz, M. Droske, and M. Rumpf, in Inverse Problems, Image Analysis and Medical Imaging, AMS Special Session Interaction of Inverse Problems and Image Analysis, volume 313, pp.67-84, AMS,2002; and *Iterative multigrid regularization techniques for image matching*, Stefan Henn and Kristian Witsch, SIAM J. Sci. Comput., 23(4): 1077-1093, 2001).

Figure 2:
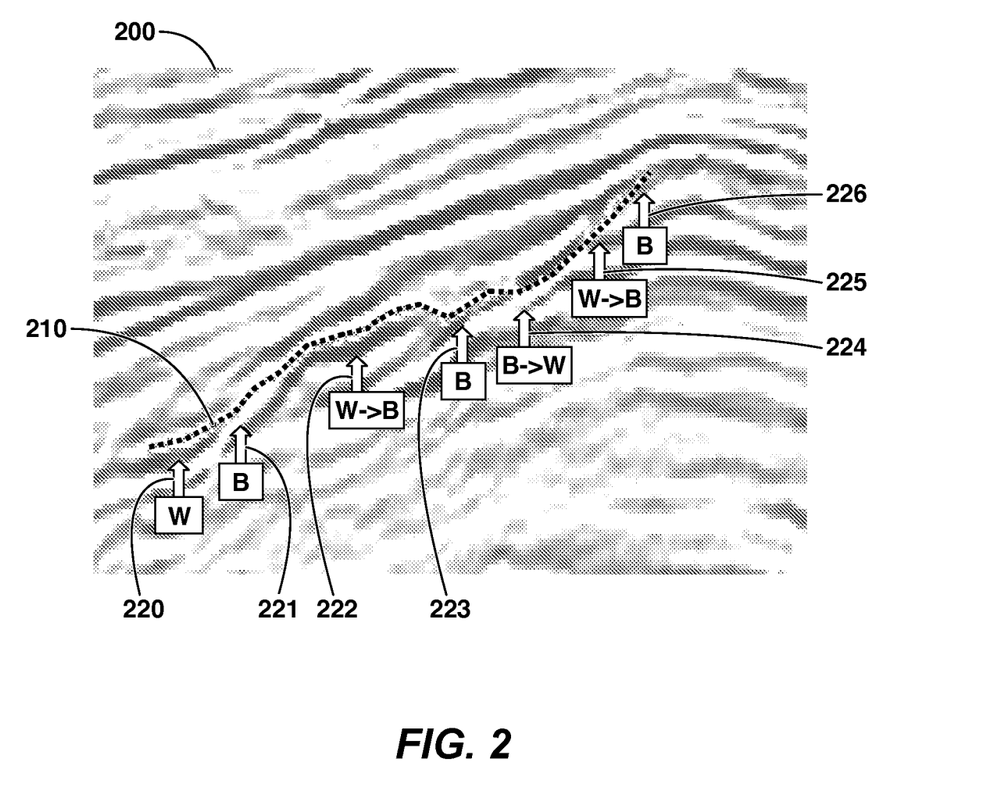
FIG. 2 is an exemplary image having an inconsistent character of the seismic data around a geologic object of interest in accordance with certain aspects of the present techniques.
Figure 3A:
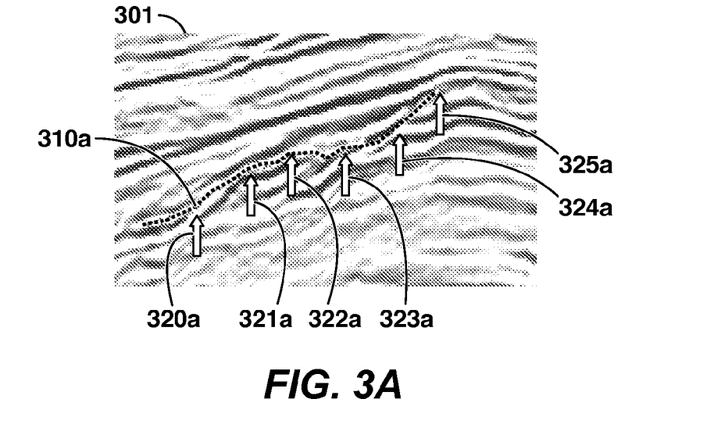
Figure 3D:
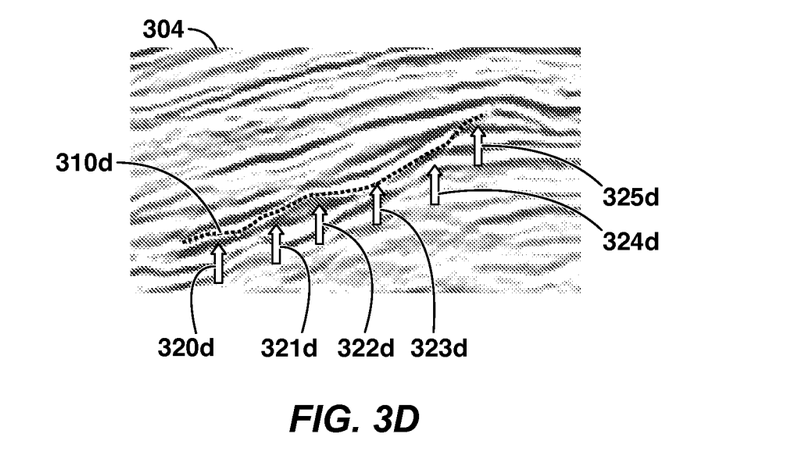
Figure 3E:
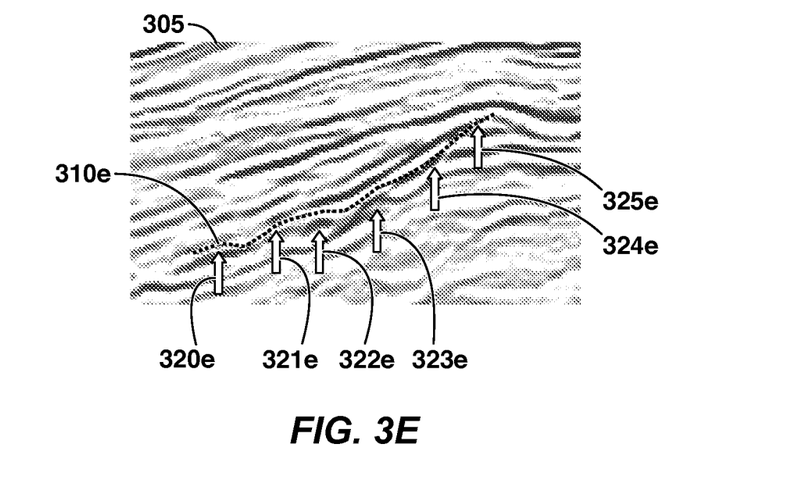

As an example of the process described in FIG. 1, FIGS. 2, 3A-3E and 4 further illustrate certain aspects of the present techniques. FIG. 2 is an exemplary image 200 having an inconsistent or anomalous character of the seismic data around a geologic object of interest in accordance with certain aspects of the present techniques. In this image 200, the inconsistent character of the seismic data around a geologic object of interest is shown. The image 200 is a cross section or slice through a 3D seismic amplitude volume. The seismic amplitude values are displayed using a grayscale color mapping. The white regions W in the image 200 are associated with high negative seismic amplitudes and black regions B in the image 200 are associated with high positive amplitudes. Also shown in this image 200 is an initial set of points connected together to create a polyline 210 that defines a geologic object. The polyline 210 may be obtained, as discussed above in block 110. Arrows 220-227 are directed to points identified as part of the polyline 210 (e.g., white regions W, black regions B, peak to trough regions W->B, and trough to peak regions B->W) that exemplify the inconsistent seismic character associated in the area around polyline. Please note that conventional automated horizon and fault tracking algorithms are limited and do not track the feature of interest (e.g., polyline) due to the variable seismic character of peaks, troughs, and zero crossing (both going from troughs to peaks and peaks to troughs).

FIGS. 3A-3E are exemplary images of extending a geologic object boundary or a geologic object in one cross section to a set of cross sections in accordance with certain aspects of the present techniques. FIGS. 3A-3E are images 301-305 results from the present techniques to extend a geologic object (e.g. polyline 310a-310e) from the image 301 of the first cross section or slice to the other images 302-305 (e.g. additional cross sections or slices). The seismic data in the images 301-305 is displayed using the same visualization parameters utilized in FIG. 2. Arrows 320a-320e, 321a-321e, 322a-322e, 323a-323e and 325a-325e are added to indicate points along the polyline associated with the geologic object's location. In image 301, the slice contains the initial starting polyline 310a of a geologic object, which is associated with the same geologic object's boundary shown in FIG. 2. The subsequent images 302-305 include the results of using the transformation vector to project the position of the starting polyline 310a to the corresponding images 302-305. The projected polylines 310b-310e in these images 302-305 produce a final interpretation which closely matches the results if this object were interpreted manually, but is performed more efficiently.

Figure 4:
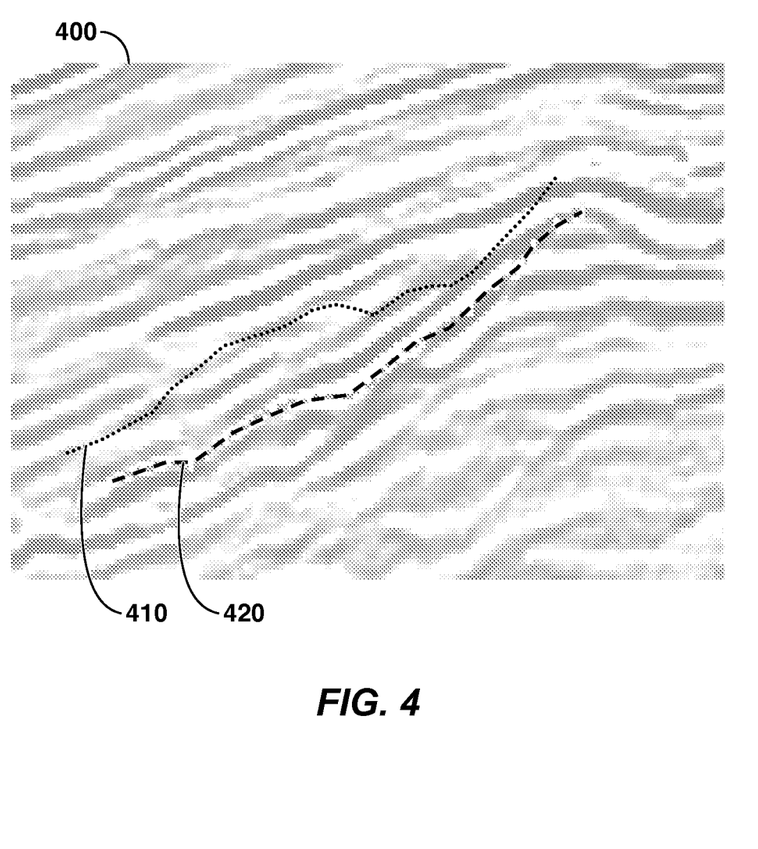
FIG. 4 is an exemplary image of the comparison of the initial geologic object indentifier and a corresponding geologic object having shape changes in the geologic object boundaries across the cross sections in accordance with certain aspects of the present techniques.

FIG. 4 is an exemplary image 400 of the comparison of the initial geologic object boundary (e.g. polyline 410) and a corresponding geologic object boundary (e.g., polyline 420) having shape changes in the geologic object boundaries across the cross sections in accordance with certain aspects of the present techniques. In the image 400, a comparison of the initial starting polyline 410 and projected polyline 420 is shown. As is evident, the starting or original polyline 410 has moved at non-uniform distances to the updated polyline 420. That is, the polyline 410 has moved down and to the right by differing values to align with the seismic character. The revised polyine 420 appears to have a more consistent trough or trough-peak character.

Figure 5:
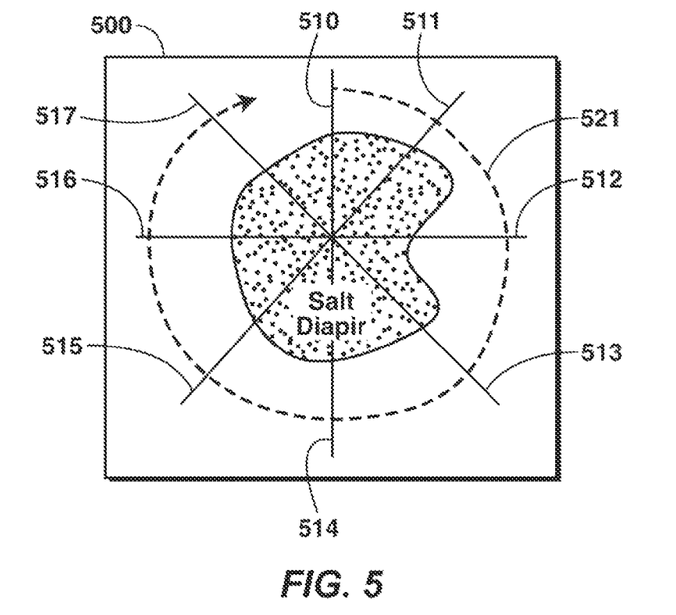
FIG. 5 is an exemplary radial selection of cross sections to provide enhanced estimation of the transformation vector for diapir shaped geologic object in accordance with certain aspects of the present techniques.
Figure 6:
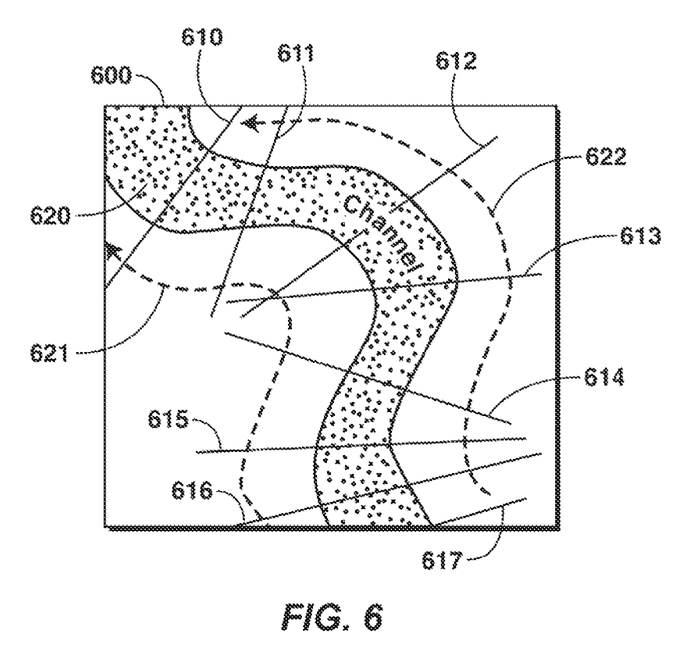
FIG. 6 is an exemplary selection of cross sections following the axis of a channel to provide enhanced estimation of the transformation vector for diapir shaped geologic object in accordance with certain aspects of the present techniques.

As discussed above in other exemplary applications, the cross sections may be parallel to each other or oblique to each other. FIGS. 5 and 6 are images of selected cross sections to provide an enhanced estimation of the transformation vector for diapir shaped geologic objects in accordance with certain aspects of the present techniques. In particular, FIG. 5 is an exemplary image 500 of a selection of radial cross sections 510-517 through a geologic object 520. The dashed line 521 represents that there additional cross sections in between the cross sections 510-517. These radial cross sections 510-517 provide an enhanced estimation of the transformation vector for the diapir shaped geologic body 520. As a result, the geologic object 520 may be more accurately represented.

FIG. 6 is an exemplary image 600 of a selection of cross sections 610-617 that cross the axis of a channel 620. The dashed lines 621-622 represent that there are additional cross sections in between the cross sections 610-617. In this image 600, the cross sections 610-617 provide enhanced estimation of the transformation vector for diapir shaped geologic features. As a result, the geologic object 620 may be more accurately represented.

Further, the above mentioned process may be used to provide some uncertainty analysis. For instance, a first identifier may be selected for one cross section and subsequently generated for the other cross sections. Then, a second identifier may be selected for one cross section and subsequently generated for the other cross sections. The second identifier is different from the first identifier, which may be one or more different points, different polyline, region or any combination. Then, the identifiers generated from the two different identifiers for the other cross sections may be compared to perform an uncertainty analysis.

An exemplary method for producing hydrocarbons from a subsurface region may include various drilling and operational activities based on geologic objects identified from the above process. The drilling, development, and/or production of a hydrocarbon bearing asset may be controlled within the subsurface region based on the predicted data from the present techniques. Hydrocarbons may be produced from the hydrocarbon bearing asset. Controlling production of the hydrocarbon bearing asset may include optimizing well location or well production.

Figure 7:
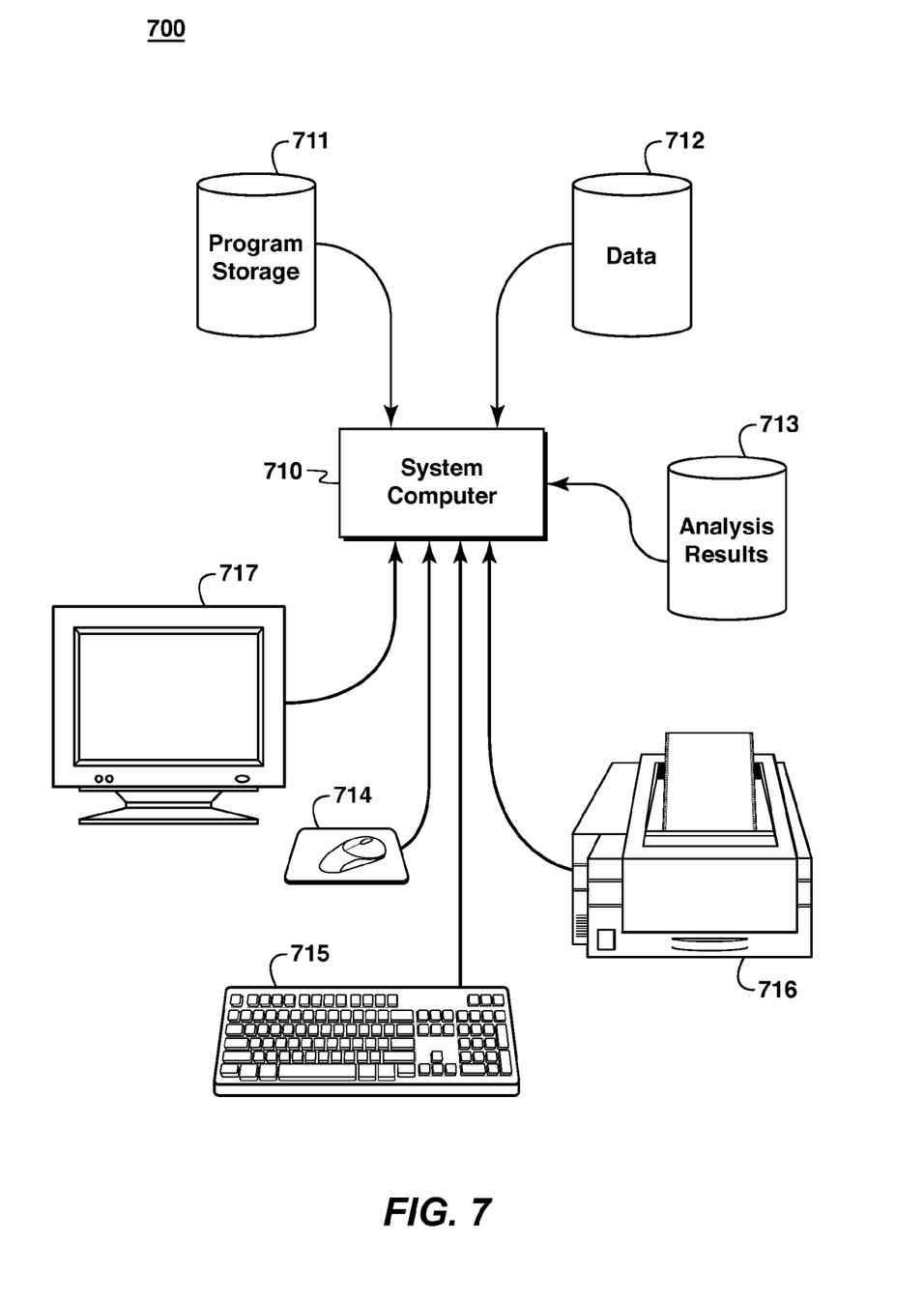
FIG. 7 is an exemplary processor based system which is implemented to perform certain aspects of the present techniques.

One or more of the aforementioned processes and/or techniques to generate geologic bodies for a data volume may be implemented in processor based devices, such as digital electronic circuitry, computer hardware, firmware, software, or in any combination thereof. FIG. 7 is an exemplary processor based system 700 which is implemented to perform certain aspects of the present techniques. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the present techniques may be performed by one or more programmable processors executing a computer program to perform functions of the invention by operating on input data and generating output. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the simulations and/or calculated transport properties obtained through any of the aforementioned process steps or processes.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

As an example, FIG. 7 is an exemplary processor based system which is implemented to perform certain aspects of the present techniques. In this system 700, a system computer 710 communicates with various other devices. These other devices may include storages devices, such as program storage 711, data 712, and analysis 713. These storage devices 711-713 may include instructions to perform the all or portions of the process described above. To interact with the system computer 710 various input devices, such as mouse 714 and keyboard 715, may be utilized. These input devices 714 and 715 may enable a user to enter data and extract data from the system computer 710. Also, display devices, such as printer 716 and monitor 717, may be utilized to display the data to a user. For instance, the user may view/edit cross sections through the use of the monitor 717, mouse 714 and the keyboard 715.

All such modifications and variations are intended to be within the scope of the appended claims. Persons skilled in the art will also readily recognize that in preferred embodiments, at least some of the steps are performed on a computer, e.g., the exemplary processes may be computer implemented. In such cases, the resulting model parameters may either be downloaded or saved to computer memory.

We claim:

1. A method comprising:
    obtaining, with a computer, a 3D seismic volume having a set of cross sections;
    selecting, with the computer, at least a first cross section and a second cross section from the set of cross sections;
    identifying, with the computer, a geologic object in the first cross section;
    estimating, with the computer, a transformation vector between the first cross section and the second cross section, wherein the transformation vector determines a pixel to pixel correspondence between the first cross section and the second cross section and is determined by shape deformation and movement of boundaries of the geologic object in the second cross section relative to the first cross section;
    calculating, with the computer, boundaries of the geologic object in other cross sections from the set of cross sections by using the estimated transformation vector; and
    generating, with the computer, a subsurface model that includes the boundaries of the geologic object, and using the subsurface model and the boundaries of the geologic object to identify hydrocarbon bearing zones within a reservoir for hydrocarbon exploration or production.

2. The method of claim 1, wherein using the estimated transformation vector further comprises:
    obtaining a first identifier associated with the geologic object in one of the set of cross sections;
    determining an additional identifier associated with the geologic object in at least one additional cross section of the set of cross sections based on the estimated transformation vector and the obtained first identifier;
    storing the determined identifier of the geologic object in memory.

3. The method of claim 1, wherein using the estimated transformation vector further comprises determining at least one of structural geology and stratigraphic geology associated with the geologic object within the 3D seismic volume.

4. The method of claim 1, wherein using the estimated transformation vector further comprises visualizing magnitude and direction of the estimated transformation vector to identify the geologic object within the 3D seismic volume.

5. The method of claim 1, wherein the first cross section and the second cross section are parallel to each other.

6. The method of claim 1, wherein the first cross section and second cross section are oblique to each other.

7. The method of claim 2, wherein obtaining the first identifier associated with the geologic object in one of the set of cross sections comprises a user providing the first identifier by selecting points on the first cross section or the second cross section.

8. The method in claim 2, wherein obtaining the first identifier associated with the geologic object in one of the set of cross sections comprises obtaining the identifier from a memory location.

9. The method in claim 2, wherein the first identifier is one of a polyline, a set of points, a set of polylines, regions of a cross section, and any combination thereof.

10. The method in claim 2, further comprising:
    obtaining a second identifier associated with the geologic object in one of the set of cross sections, wherein the second identifier is different from the first identifier;
    determining an additional identifier associated with the geologic object in at least one additional cross section of the set of cross sections based on the estimated transformation vector and the obtained second identifier;
    comparing the identifiers associated with the second identifier and the identifiers associated with the first identifier to perform an uncertainty analysis.

11. The methods in claim 4, wherein magnitude and direction of the transformation vector are visualized separately.

12. The method in claim 4, wherein direction of the transformation vector is visualized by using a plurality of colors.

13. The method in claim 11, wherein the transformation vector is assigned distinct colors for different orthogonal directions and transformation vector between two orthogonal directions is assigned blended colors associated with the assigned distinct colors.

14. The method of claim 1, further comprising acquiring seismic data representative of the subsurface region.

15. A non-transitory computer-readable storage medium having embodied thereon a computer program, which when executed by a processor, causes the processor to execute a method of identifying a geologic object through cross sections of a 3D seismic volume, the method comprising:
   obtaining, with the processor, the 3D seismic volume having a set of cross sections;
   selecting, with the processor, a first cross section and a second cross section from the set of cross sections;
   identifying, with the processor, a geologic object in the first cross section;
   estimating, with the processor, a transformation vector between the first cross section and the second cross section, wherein the transformation vector determines a pixel to pixel correspondence between the first cross section and the second cross section and is determined by shape deformation and movement of boundaries of the geologic object in the second cross section relative to the first cross section;
   calculating, with the processor, boundaries of the geologic object in other cross section from the set of cross sections by using the estimated transformation vector; and
   generating, with the processor, a subsurface model that includes the boundaries of the geologic object, and using the subsurface model and the boundaries of the geologic object to identify hydrocarbon bearing zones within a reservoir for hydrocarbon exploration or production.

16. The non-transitory computer-readable storage medium of claim 15, wherein the method further comprises:
   obtaining a first identifier associated with the geologic object in one of the set of cross sections;
   determining an additional identifier of the geologic object in at least one additional cross section of the set of cross sections based on the estimated transformation vector and the obtained first identifier;
   storing the determined additional identifier of the geologic object in the medium.

17. The non-transitory computer-readable storage medium of claim 15, wherein the method further comprises determining at least one of structural geology and stratigraphic geology associated with the geologic object within the 3D seismic volume.

18. The non-transitory computer-readable storage medium of claim 15, wherein the method further comprises displaying magnitude and direction of the estimated transformation vector to identify the geologic object within the 3D seismic volume.

19. The non-transitory computer-readable storage medium of claim 15, wherein the first cross section and the second cross section are parallel to each other or oblique to each other.

20. The non-transitory computer-readable storage medium of claim 16, wherein the method further comprises obtaining the first identifier via a user providing the first identifier by selecting points on one of the first cross section or the second cross section.

21. The non-transitory computer-readable storage medium of claim 16, wherein the method comprises obtaining the first identifier from a memory location.

22. The non-transitory computer-readable storage medium of claim 15, wherein the method comprises displaying magnitude and direction of the transformation vector separately.

23. The non-transitory computer-readable storage medium of claim 15, wherein the method comprises displaying direction of the transformation vector using a plurality of colors.

24. A method for producing hydrocarbons from a subsurface region, comprising:
   obtaining, with a computer, a 3D seismic volume having a set of cross sections;
   selecting, with the computer, a first cross section and a second cross section from the set of cross sections;
   identifying, with the computer, a geologic object in the first cross section;
   estimating, with the computer, a transformation vector between the first cross section and the second cross section, wherein the transformation vector determines a pixel to pixel correspondence between the first cross section and the second cross section and is determined by a shape deformation and movement of boundaries of the geologic object in the second cross section relative to the first cross section;
   using, with the computer, the estimated transformation vector to calculate boundaries of the geologic object in other cross sections from the set of cross sections;
   generating, with the computer, a subsurface model that includes the boundaries of the geologic object, and using the model and the boundaries of the geologic object to identify hydrocarbon bearing zones within a reservoir for hydrocarbon exploration or production; and
   producing hydrocarbons from the hydrocarbon bearing zones of the reservoir.

25. The method of claim 1, wherein the transformation vector is estimated by minimizing objective function E, $$E = \frac{1}{2} \int_\Omega (\tilde{I}_i - I_{i+1})^2 \alpha \|\nabla V\|^2$$

where $\tilde{I} = I_i(x + V_{i,i+l}(x))$, $I_{i+l} = I_{i+l}(x)$, $V = V_{i,i+l}(x)$, x is a two dimensional orthogonal coordinate in a cross section domain $\Omega$, $\alpha$ is a regularization parameter, $\|\nabla V\|^2$ is a regularization term, $I_i$ is a cross section, and $V_{i,i+l}$ is a transformation vector field.

* * * * *